United States Patent

Yokota

(10) Patent No.: US 10,481,003 B2
(45) Date of Patent: Nov. 19, 2019

(54) INTERFERENCE SPECTROPHOTOMETER AND TWO-BEAM INTERFEROMETER

(71) Applicant: SHIMADZU CORPORATION, Kyoto-shi, Kyoto (JP)

(72) Inventor: Kazumi Yokota, Kyoto (JP)

(73) Assignee: SHIMADZU CORPORATION, Kyoto-shi, Kyoto (JP)

(*) Notice: Subject to any disclaimer, the term of this patent is extended or adjusted under 35 U.S.C. 154(b) by 0 days.

(21) Appl. No.: 16/294,294

(22) Filed: Mar. 6, 2019

(65) Prior Publication Data

US 2019/0277699 A1 Sep. 12, 2019

(30) Foreign Application Priority Data

Mar. 7, 2018 (JP) .................. 2018-040426

(51) Int. Cl.
*G01J 3/42* (2006.01)
*G01J 3/45* (2006.01)
*G01J 3/10* (2006.01)

(52) U.S. Cl.
CPC .. *G01J 3/45* (2013.01); *G01J 3/10* (2013.01)

(58) Field of Classification Search
CPC ........ G01J 3/45; G01J 3/02; G01J 3/10; G01J 3/46; G01J 3/445; G01J 3/12; G01B 9/02; G01N 21/35; G05B 1/06
See application file for complete search history.

(56) References Cited

U.S. PATENT DOCUMENTS 5,164,788 A * 11/1992 Yoshikawa ........... G01J 3/4535
356/452

FOREIGN PATENT DOCUMENTS

JP 2012-007943 A 1/2012
WO 2016/124970 A1 8/2016

OTHER PUBLICATIONS

Communication dated Aug. 7, 2019, from the European Patent Office in counterpart European Application No. 19160895.9.

* cited by examiner

*Primary Examiner* — Abdullahi Nur
(74) *Attorney, Agent, or Firm* — Sughrue Mion, PLLC

(57) ABSTRACT

In a two-beam interferometer, the moving speed of a movable mirror for producing interference light to generate a spectrum is changed at each completion of an operation cycle during which a reciprocal motion or one-way motion of the movable mirror is performed one or more times. Intensity signals of the interference light are obtained by a plurality of detection operations, where each detecting operation includes a series of detecting operations corresponding to the reciprocal motion or one-way motion of the movable mirror performed one or more times. A piece of information which changes depending on the moving speed of the movable mirror is extracted from the intensity signals obtained by the detection operations. This speed-dependent information corresponds to periodic noise superposed on the intensity signals. Accordingly, a false peak which would otherwise appear on the spectrum due to the periodic noise can be eliminated by removing the speed-dependent information.

6 Claims, 2 Drawing Sheets

INTERFERENCE SPECTROPHOTOMETER AND TWO-BEAM INTERFEROMETER

TECHNICAL FIELD

The present invention relates to an interference spectrophotometer, such as a Fourier transform infrared spectrophotometer (FTIR), and more specifically, to a two-beam interferometer for generating interference light in an interference spectrophotometer.

BACKGROUND ART

A Fourier transform infrared spectrophotometer (FTIR) has a two-beam interferometer, a representative of which is a Michelson interferometer including a beam splitter, fixed mirror and movable mirror. The movable mirror is made to move so as to change the optical path length difference (or phase difference) between two light beams and thereby generate infrared interference light whose amplitude (intensity) changes (i.e. the so-called "interferogram"). This infrared interference light is cast into or onto a sample, and the intensity of the light transmitted through or reflected by the sample is detected with a photodetector to obtain an interferogram of the transmitted or reflected light. By Fourier-transforming this interferogram, a spectrum (spectral characteristics) of the transmitted or reflected light can be obtained. This spectrum can be represented on a coordinate system which, for example, has a horizontal axis indicating the wavelength (or wavenumber) and a vertical axis indicating the intensity (e.g. absorbance or transmittance). A spectrum which covers a predetermined range of wavelengths can be obtained from an interferogram generated by one scan of a predetermined distance with the movable mirror (see Patent Literature 1).

Acquisition of exact and highly reproducible spectrum data requires accurate control of the timing of the measurement of the intensity of the transmitted or reflected light of the infrared interference light in the photodetector (this intensity is hereinafter called the "infrared interference light intensity") and the moving position of the movable mirror. In other words, it is necessary to accurately control the optical path length difference between the two light beams. To this end, the two-beam interferometer normally includes a control interferometer for generating a signal for the sampling of the data of the infrared interference light intensity in addition to the main interferometer for the acquisition of the interferogram. The control interferometer generates laser interference light using a monochromatic light source (laser light source) as well as the beam splitter, fixed mirror, movable mirror and other elements which are shared with the main interference. A mirror is placed in an optical path of the main interferometer to extract the laser interference light from the optical path. The extracted light is introduced into a laser detector. Making the movable mirror move at a fixed speed causes a sinusoidal change in the intensity of the laser interference light at a fixed frequency. This sinusoidal wave is detected as a laser interference fringe signal. Based on this interference fringe signal, a signal for the data sampling is generated.

The interference fringe signal is normally processed as a voltage signal having an amplitude in both the plus and minus directions from a reference potential. The level of the voltage signal detected under the condition that the optical path length difference is zero is defined as the reference potential. The infrared interference light intensity is measured at the timing of an upward zero-crossing of the voltage signal (a point in time at which the signal rises above the reference potential) and/or the timing of a downward zero-crossing (a point in time at which the signal falls below the reference potential). A helium-neon (He—Ne) laser light source with an oscillation frequency of 632.8 nm is commonly used as the laser light source for the control interferometer in a FTIR. In that case, the infrared interference light intensity is measured at each point in time where the movable mirror reaches a position where the optical path length difference between the two light beams of the control interferometer equals an integer multiple of 632.8 nm or 316.4 nm.

CITATION LIST

Patent Literature

Patent Literature 1: JP 2012-7943 A

SUMMARY OF INVENTION

Technical Problem

In the measurement of the infrared interference light, external noise may be mixed into the measurement signal. If the noise is random noise, it can be easily removed, for example, by repeating the measurement. By comparison, if the noise is periodic noise, it cannot be distinguished from a signal having a specific frequency in the interferogram (i.e. a frequency which is specific to a component contained in the sample). Consequently, a false peak having a wavelength (or wavenumber) corresponding to the frequency of the periodic noise appears in the spectrum along with a peak having a wavelength (or wavenumber) corresponding to a specific frequency.

The problem to be solved by the present invention is to eliminate a false peak which appears in a spectrum due to periodic noise in a Fourier transform spectrophotometer for measuring the intensity of interference light at a regular timing while making a movable mirror move at a fixed speed.

Solution to Problem

A Fourier transform spectrophotometer according to the present invention developed for solving the previously described problem includes:

a) a two-beam interferometer configured to produce interference light from multiwavelength light generated from a multiwavelength light source, the two-beam interferometer including a beam splitter configured to split the multiwavelength light into two light beams, a fixed mirror and a movable mirror configured to respectively reflect the two light beams back to the beam splitter, as well as a movable mirror driver configured to make the movable mirror reciprocally move at a given moving speed;

b) a detector configured to detect an intensity of the interference light and to output an intensity signal for each predetermined amount of change in an optical path length difference between the two light beams produced by the beam splitter;

c) a speed changer configured to change, by a predetermined amount, the value of the moving speed of the movable mirror, using the movable mirror driver, at each completion of an operation cycle during which a reciprocal motion or one-way motion of the movable mirror is performed one or more times:

d) a signal storage section configured to store intensity signals of the interference light obtained by a plurality of detection operations and relating each of the intensity signals to a value of the optical path length difference, where each of the detection operations includes a series of detecting operations performed by the detector corresponding to the reciprocal motion or one-way motion of the movable mirror performed one or more times; and e) an information extractor configured to extract speed-dependent information from intensity signals of the interference light obtained by the plurality of detection operations and stored in the signal storage section, where the speed-dependent information represents a change in the intensity signal depending on the moving speed of the movable mirror.

In the previously described Fourier transform spectrophotometer, while the movable mirror is made to reciprocally move multiple times, the moving speed of the movable mirror is changed by a predetermined amount at every completion of an operation cycle in which the reciprocal motion or one-way motion of the movable mirror is performed one or more times (the entire motion of the movable mirror during this cycle is hereinafter called the "unit distance motion"), and the intensity signals of the interference light generated during the unit distance motion are detected with the detector. The detector is operated so as to detect the intensity signals of the interference light for each specific amount of change in the optical path length difference between the two light beams (i.e. at regular intervals of the optical path length difference) regardless of the moving speed of the movable mirror. The interval of time for the detector to detect the intensity signal of the interference light becomes longer as the moving speed decreases, or shorter as the moving speed increases. Therefore, if there is periodic noise being generated at a fixed frequency, the timing at which the periodic noise is superposed on the intensity signal in a series of detecting operations (one detection operation) performed in the detector during the unit distance motion of the movable mirror changes with the moving speed of the movable mirror. In other words, if a piece of information which changes depending on the moving speed of the movable mirror is present in a plurality of sets of intensity signals of the interference light respectively obtained by a plurality of detection operations, it is possible to consider that the piece of information has been altered by the superposition of periodic noise. Accordingly, the information extractor checks a plurality of sets of intensity signals of the interference light respectively obtained by a plurality of detection operations, to determine whether or not there is a piece of information which changes depending on the moving speed of the movable mirror. If such information has been located, the information extractor extracts the information as speed-dependent information.

For the information extractor to extract speed-dependent information, the range of the phase difference (optical path length difference) of a series of signal intensities of the interference light obtained by one detection operation must always be the same. To this end, the motion of the movable mirror within one detection operation may include at least a single one-way motion. However, making the movable mirror reciprocally move one or more times within one detection operation is preferable in that the noise which occurs due to the motion of the movable mirror can be reduced by accumulating the intensity signals obtained during each one-way motion and using the accumulated signals as the intensity signals obtained by one detection operation.

The Fourier transform spectrophotometer having the previous configuration may further include an interferogram creator for creating one interferogram from the intensity signals of the interference light obtained by the one detection operation, and the information extractor may be configured to extract the speed-dependent information based on a plurality of interferograms obtained by the plurality of detection operations.

The Fourier transform spectrophotometer having the previous configuration may further include a spectrum creator for obtaining one interferogram from the intensity signals of the interference light obtained by the one detection operation, and for creating one spectrum by Fourier-transforming the one interferogram, and the information extractor may be configured to compare a plurality of spectra obtained by a plurality of detection operations, to locate a peak which changes depending on the moving speed of the movable mirror, and to extract position information of the located peak as the speed-dependent information.

As noted earlier, the speed-dependent information extracted by the information extractor can be considered as a piece of information corresponding to periodic noise.

Accordingly, it is preferable that the Fourier transform spectrophotometer having the previous configuration further include:

a corrector for correcting the intensity signals of the interference light obtained by at least one detection operation among the plurality of detection operations, based on the extracted speed-dependent information; and an interferogram creator for creating an interferogram from the corrected intensity signals of the interference light, or a spectrum creator for obtaining an interferogram from the corrected intensity signals of the interference light and creating a spectrum from the interferogram.

A two-beam interferometer according to the present invention developed for solving the previously described problem includes:

a) a beam splitter configured to split multiwavelength light generated from a multiwavelength light source into two light beams;

b) a fixed mirror and a movable mirror configured to respectively reflect the two light beams back to the beam splitter;

c) a movable mirror driver configured to make the movable mirror reciprocally move at a given moving speed; and d) a speed changer configured to change, by a predetermined amount, the value of the moving speed of the movable mirror using the movable mirror driver every time the movable mirror is made to move a predetermined distance.

Advantageous Effects of Invention

If periodic noise is superposed on intensity signals of interference light obtained by one detection operation, a false peak due to the periodic noise will appear on a spectrum obtained by Fourier transform of an interferogram created from the intensity signals. A Fourier transform spectrophotometer having the previously described configuration can remove such periodic noise from the intensity signals of the interference light and thereby eliminate a false peak which would otherwise appear on a spectrum due to the periodic noise.

DESCRIPTION OF EMBODIMENTS

A specific embodiment of the present invention is hereinafter described with reference to the drawings.

Figure 1:
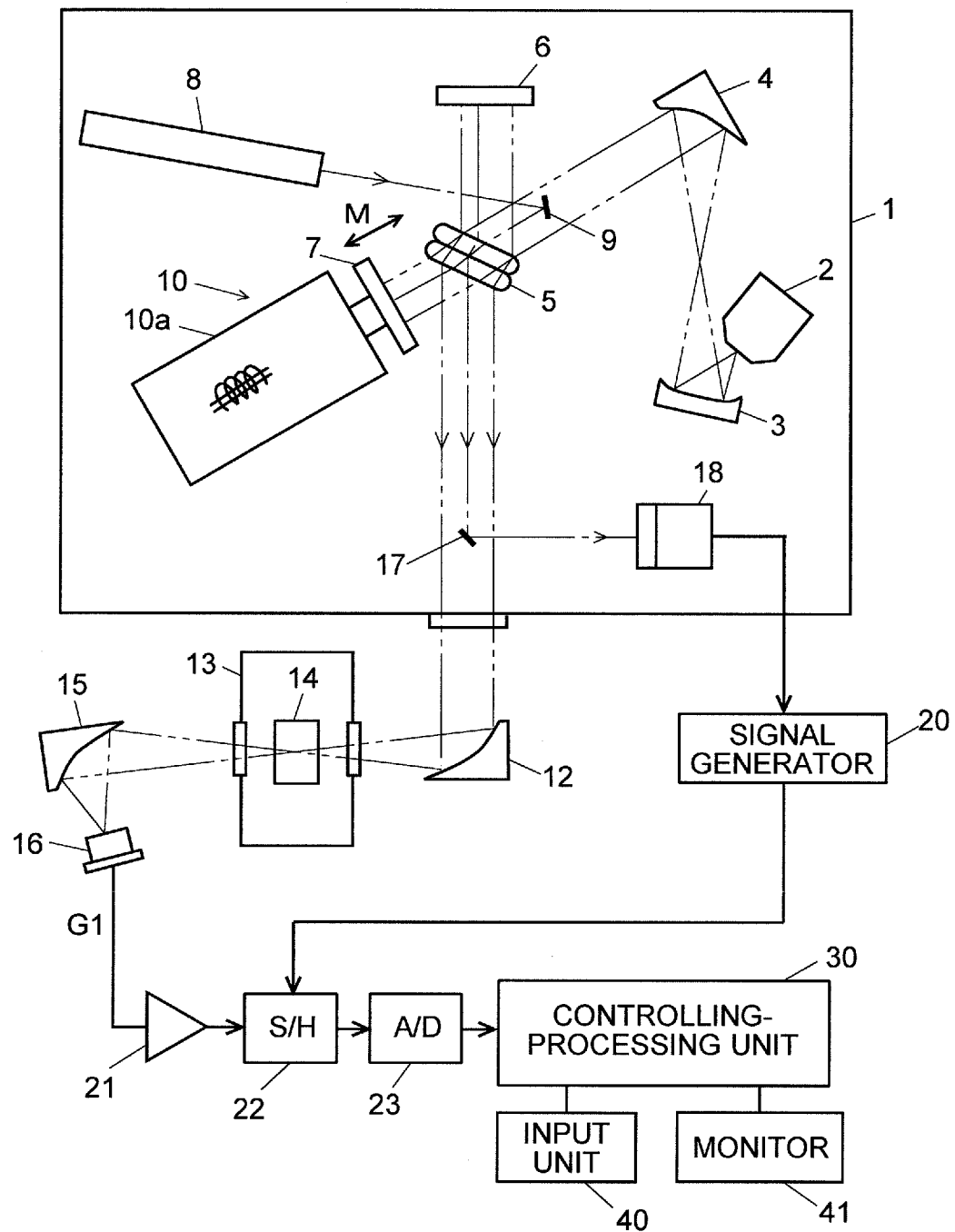
FIG. 1 is a schematic configuration diagram of an FTIR according to one embodiment of the present invention.

FIG. 1 shows an optical-path configuration of a two-beam interferometer according to the present embodiment and a Fourier transform infrared spectrophotometer (FTIR) using the interferometer. The FTIR according to the present embodiment includes a main interferometer for obtaining an interferogram as well as a control interferometer for controlling the moving speed of a movable mirror and generating a timing signal for the sampling of the signals obtained with a photodetector in the main interferometer. The main interferometer includes an infrared light source 2, condensing mirror 3, collimator mirror 4, beam splitter 5, fixed mirror 6 and movable mirror 7, which are all placed within an interferometer chamber 1. The control interferometer includes a laser light source 8 and a laser mirror 9 as well as the beam splitter 5, fixed mirror 6 and movable mirror 7. The movable mirror 7 is driven by a driving device 10 including a linear motor 10a and a linear guide (not shown). The linear motor includes a voice coil and a magnet. Applying a voltage to the voice coil in the linear motor 10a produces electromagnetic force, which makes the movable mirror 7 reciprocally move along the linear guide in the direction indicated by arrow M.

The main interferometer generates infrared interference light to be used for a spectrum measurement of a sample 14 in a sample chamber 13 located outside the interferometer chamber 1. Specifically, the infrared light emitted from the infrared light source 2 is cast onto the beam splitter 5 via the condensing mirror 3 and the collimator mirror 4. The beam splitter splits the infrared light into two beams directed to the fixed mirror 6 and the movable mirror 7, respectively. After being reflected by the fixed mirror 6 and the movable mirror 7, the two light beams return to the beam splitter 5. At the beam splitter 5, the two light beams are merged back into one beam and sent into an optical path which leads to a parabolic mirror 12. During the measurement, the movable mirror 7 is made to continuously move back and forth in the direction indicated by arrow M. Therefore, the two merged beams form interference light whose amplitude varies with time. After being condensed by the parabolic mirror 12, the light enters the sample chamber 13 and is cast onto the sample 14 placed within the sample chamber 13. The light which has passed through the sample 14 is focused onto an infrared detector 16 by an ellipsoidal mirror 15.

The control interferometer generates laser interference light to be used for obtaining an interference fringe signal. Specifically, the laser light emitted from the laser light source 8 is cast onto the beam splitter 5 via the laser mirror 9 and forms interference light directed toward the parabolic mirror 12, as with the infrared light. The laser interference light forms a beam of light with an extremely small diameter and travels forward, to be eventually reflected by a laser mirror 17 in the optical path and introduced into a laser detector 18.

The light-receiving signal produced by the laser detector 18, i.e. the laser interference fringe signal (which is normally called the "fringe signal"), is sent to a signal generator 20, which generates a pulse signal for the sampling of a light-receiving signal for the infrared interference light. The laser light interference fringe signal is also sent to the controlling-processing unit 30 and used for a stable drive control of the movable mirror 7. A He—Ne laser (with an oscillation frequency of 632.8 nm) is commonly used as the laser light source 8. The pulse signal generated by the signal generator 20 has the same frequency as the laser interference fringe signal.

The interference light which has passed through the sample 14 placed within the sample chamber 13 is received by the infrared detector 16 as an analogue signal. The light-receiving signal obtained with the infrared detector 16 is amplified by the amplifier 21 and sampled by a sample-and-hold circuit (S/H) 22 at the timing determined by the pulse signal mentioned earlier. The sampled signal is subsequently converted into digital data by an analogue-to-digital converter (A/D) 23. The digital data is sent to the controlling-processing unit 30.

The controlling-processing unit 30 may be a dedicated controlling-processing device. However, it is more common to use a personal computer on which dedicated controlling-processing software is installed. An input unit 40 for allowing users to perform various input operations using a keyboard or pointing device (e.g. mouse), as well as a monitor 41 for displaying measurement results and other related information, are connected to the computer.

Figure 2:
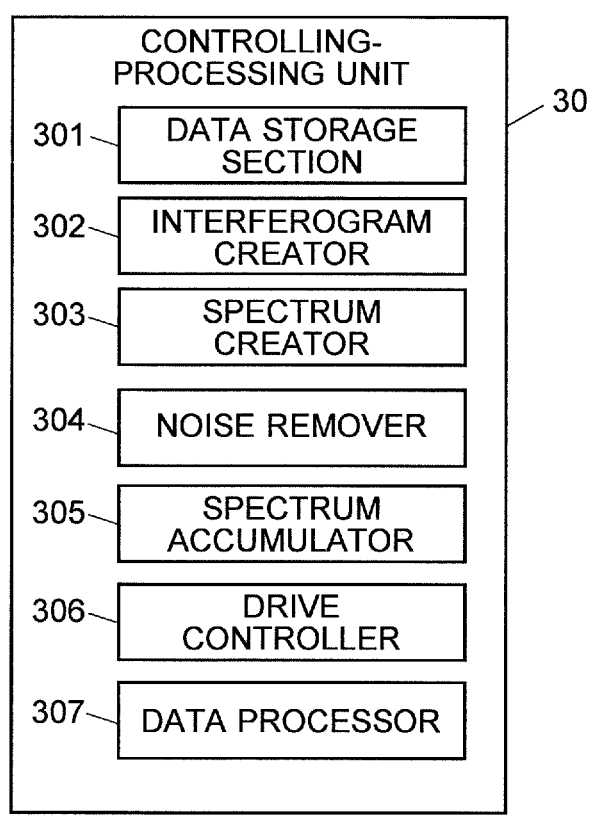
FIG. 2 is a configuration diagram of a controlling-processing unit.

FIG. 2 is a schematic diagram showing the configuration of the controlling-processing unit 30. The controlling-processing unit 30 includes: a data storage section 301 for storing digital data received from the A/D converter 23; an interferogram creator 302 for extracting, from the data stored in the data storage section 301, a series of data corresponding to one reciprocal motion of the movable mirror 7, as a set of data for one detection operation, and for creating one interferogram from the extracted data; a spectrum creator 303 for creating one spectrum by performing a Fourier-transform operation on one interferogram; a noise remover 304 for extracting a noise component from a plurality of spectra corresponding to a plurality of detection operations by comparing those spectra, and for removing the noise from each of the spectra; and a spectrum accumulator 305 for creating an accumulated spectrum by accumulating a plurality of spectra from which the noise has been removed. The data of the accumulated spectrum created by the spectrum accumulator 305 is stored in the data storage section 301. The controlling-processing unit 30 also includes a drive controller 306 for changing the moving speed of the movable mirror 7 by regulating the voltage applied to the voice coil in the linear motor 10a, as well as a data processor 307 and other related components.

A characteristic operation of the FTIR according to the present embodiment is hereinafter described.

In the present embodiment, a spectrum of the infrared interference light transmitted through the sample 14 is obtained from light-receiving signals produced by the infrared detector 16 while the movable mirror 7 is made to continuously move back and forth multiple times. The drive controller 306 regulates the voltage applied to the voice coil in the linear motor 10a so as to constantly maintain the moving speed of the movable mirror 7 during each reciprocal motion of the movable mirror 7 while changing (increasing or decreasing) the moving speed of the movable mirror 7 by a predetermined amount every time the movable mirror 7 proceeds from one reciprocal motion to the next.

The light-receiving signal produced by the infrared detector 16 during one reciprocal motion of the movable mirror 7 is sampled by the sample-and-hold circuit 22 every time the optical path length difference between the two light beams of the control interferometer is increased or decreased by 632.8 nm. The sampled signal is subsequently converted into digital data by the A/D converter 23 and sent to the controlling-processing unit 30. For each series of digital data received within one reciprocal motion of the movable mirror 7, the controlling-processing unit 30 relates each of the digital data to the corresponding optical path length difference and stores those digital data in the data storage section 301 as a set of data corresponding to one detection operation (this set of data is hereinafter called the "one set of detection data").

If periodic noise originating from a switching power supply, lighting power line or other elements inside or outside the FTIR is superposed on the received signals, those signals inclusive of the superposed periodic noise will be entirely converted into digital data, sent to the controlling-processing unit 30, and stored in the data storage section 301.

As described earlier, in the present embodiment, the moving speed of the movable mirror 7 is changed every time the movable mirror 7 proceeds from one reciprocal motion to the next. Therefore, although the interval of the optical path length difference for the sampling by the sample-and-hold circuit 22 is constant, the interval of time at which the sampling is performed becomes longer as the moving speed decreases, or shorter as the moving speed increases. Consequently, the (apparent) frequency of the periodic noise superposed on one set of detection data to be stored in the data storage section 301 changes depending on the interval of time of the sampling by the sample-and-hold circuit 22.

The interferogram creator 302 creates one interferogram from one set of detection data stored in the data storage section 301. The spectrum creator 303 creates one spectrum by Fourier-transforming one interferogram.

A spectrum created by Fourier-transforming an interferogram created from detection data on which periodic noise has been superposed has a peak originating from the periodic noise. The wavelength (wavenumber) of this peak is determined by the original frequency of the periodic noise and the moving speed of the movable mirror 7. Therefore, the original frequency of the periodic noise can be calculated from the moving speed of the movable mirror 7 and the wavelength at which the peak is located.

For example, Table 1 shows the relationship between the frequency of the periodic noise and the wavenumber of the peak observed on the spectrum due to the periodic noise for a movable mirror driven at a normal speed of 2.8 mm/sec as well as modified speeds of 2.8±0.1 mm/sec in the case where a detector employing a DLATGS (deuterated L-alanine-doped triglycine sulphate crystal) element (DLATGS detector) is used as the infrared detector 16.

TABLE 1

| Wavenumber (cm$^{-1}$) | Speed of Movable Mirror (mm/sec) | | |
|---|---|---|---|
| | 2.7 | 2.8 | 2.9 |
| 1968 | 1.048 | 1.088 | 1.128 |
| 1969 | 1.049 | 1.089 | 1.129 |
| . | . | . | . |
| . | . | . | . |
| . | . | . | . |
| 1999 | 1.079 | 1.119 | 1.159 |
| 2000 | 1.080 | 1.120 | 1.160 |
| 2001 | 1.081 | 1.121 | 1.161 |
| 2002 | 1.082 | 1.122 | 1.162 |
| . | . | . | . |
| . | . | . | . |
| . | . | . | . |

TABLE 1-continued

| Wavenumber (cm$^{-1}$) | Speed of Movable Mirror (mm/sec) | | |
|---|---|---|---|
| | 2.7 | 2.8 | 2.9 |
| 2015 | 1.088 | 1.128 | 1.168 |
| 2016 | 1.089 | 1.129 | 1.169 |

For example, consider the case of an interferogram obtained with the movable mirror 7 driven at 2.8 mm/sec. If periodic noise of 1.128 kHz is superposed on the interferogram, the noise will be observed as a peak with a wavenumber of 2015 cm$^{-1}$ on the spectrum. If periodic noise of 1.129 kHz is superposed on the interferogram, the noise will be observed as a peak with a wavenumber of 2016 cm$^{-1}$ on the spectrum. If periodic noise of 1.088 kHz is superposed on the interferogram, the noise will be observed as a peak with a wavenumber of 1968 cm$^{-1}$ on the spectrum. If periodic noise of 1.089 kHz is superposed on the interferogram, the noise will be observed as a peak with a wavenumber of 1969 cm$^{-1}$ on the spectrum.

If the moving speed is changed from 2.8 mm/sec to 2.9 mm/sec, the superposition of the periodic noise of 1.128 kHz on the interferogram will result in the noise being observed as a peak with a wavenumber of 1968 cm$^{-1}$ on the spectrum, while the superposition of the periodic noise of 1.129 kHz on the interferogram will result in the noise being observed as a peak with a wavenumber of 1969 cm$^{-1}$ on the spectrum. If the moving speed is changed from 2.8 mm/sec to 2.7 mm/sec, the superposition of the periodic noise of 1.088 kHz on the interferogram will result in the noise being observed as a peak with a wavenumber of 2015 cm$^{-1}$ on the spectrum, while the superposition of the periodic noise of 1.089 kHz on the interferogram will result in the noise being observed as a peak with a wavenumber of 2016 cm$^{-1}$ on the spectrum.

Those results demonstrate, for example, that the wavenumber of the peak of the periodic noise of 1.128 kHz observed on the spectrum will shift from 2015 cm$^{-1}$ by 47 cm$^{-1}$ when the moving speed is changed (increased or decreased) from 2.8 mm/sec by 0.1 mm/sec. The peaks which appear on a spectrum are normally determined by the properties (molecular structure) of a substance contained in the sample 14 and do not depend on the moving speed of the movable mirror 7. Accordingly, a peak which shows a significant change depending on the moving speed of the movable mirror 7 can be identified as a false (or altered) peak, and the frequency of the periodic noise can be determined from the peak position (wavenumber) and the moving speed of the movable mirror 7. The peak position (wavenumber or wavelength) in the present embodiment corresponds to the speed-dependent information in the present invention.

Accordingly, in the present embodiment, after a plurality of spectra have been created from a plurality of sets of data corresponding to a previously-set number of reciprocal motions (a plurality of sets of detection data) and stored in the data storage section 301, the noise remover 304 reads the plurality of spectra from the data storage section 301 and extracts, from those spectra, a peak which shows a significant change depending on the moving speed of the movable mirror 7. The noise remover 304 removes that peak from each of those spectra and send the spectra to the spectrum accumulator 305.

The present invention is not limited to the previously described embodiment.

For example, the speed-dependent information for a plurality of spectra may be the portion of each spectrum which remains after the peaks that appear in all spectra are removed from each spectrum. Furthermore, for example, a peak which appears due to periodic noise in a plurality of spectra can be removed by listing intensity values for the same wavenumber position (or wavelength position) in those spectra and choosing the median or average value of those intensity values as the intensity value at that wavenumber position.

In the previous embodiment, the speed-dependent information is extracted from the spectra created by the spectrum creator 303. Alternatively, the speed-dependent information may be extracted from the interferograms created by the interferogram creator 302. The speed-dependent information can also be extracted from the digital data sent from the A/D converter 23 to the controlling-processing unit 30.

The amount by which the moving speed of the movable mirror is changed for each reciprocal motion of the movable mirror does not need to be 0.1 mm/sec as in the previous embodiment but may be larger or smaller than this value. What is essential is to allow for the extraction of a peak which changes with the change in the moving speed of the movable mirror. The amount of change in the moving speed of the movable mirror may be smaller if the spectra are obtained with a higher level of resolving power.

REFERENCE SIGNS LIST

2 . . . Infrared Light Source
5 . . . Beam Splitter
6 . . . Fixed Mirror
7 . . . Movable Mirror
8 . . . Laser Light Source
10 . . . Driving Device
10a . . . Linear Motor
14 . . . Sample
16 . . . Infrared Detector
18 . . . Laser Detector
21 . . . Amplifier
22 . . . Sample-and-Hold (S/H) Circuit
23 . . . Analogue-to-Digital (A/D) Converter
30 . . . Controlling-Processing Unit
301 . . . Data Storage Section
302 . . . Interferogram Creator
303 . . . Spectrum Creator
304 . . . Noise Remover
305 . . . Spectrum Accumulator
306 . . . Drive Controller

The invention claimed is:

1. A Fourier transform spectrophotometer, comprising:
a) a two-beam interferometer configured to produce interference light from multiwavelength light generated from a multiwavelength light source, the two-beam interferometer including a beam splitter configured to split the multiwavelength light into two light beams, a fixed mirror and a movable mirror configured to respectively reflect the two light beams back to the beam splitter, as well as a movable mirror driver configured to make the movable mirror reciprocally move at a given moving speed;
b) a detector configured to detect an intensity of the interference light and to output an intensity signal for each predetermined amount of change in an optical path length difference between the two light beams produced by the beam splitter;
c) a speed changer configured to change, by a predetermined amount, the value of the moving speed of the movable mirror using the movable mirror driver at each completion of an operation cycle during which a reciprocal motion or one-way motion of the movable mirror is performed one or more times;
d) a signal storage section configured to store the intensity signals of the interference light obtained by a plurality of detection operations and relating each of the intensity signals to a value of the optical path length difference, where each of the detection operations includes a series of detecting operations performed by the detector corresponding to the reciprocal motion or one-way motion of the movable mirror performed one or more times; and
e) an information extractor configured to extract speed-dependent information from the intensity signals of the interference light obtained by the plurality of detection operations and stored in the signal storage section, where the speed-dependent information represents a change in the intensity signal depending on the moving speed of the movable mirror.

2. The Fourier transform spectrophotometer according to claim 1, further comprising an interferogram creator configured to create one interferogram from the intensity signals of the interference light obtained by the one detection operation, w herein:
the information extractor is configured to extract the speed-dependent information based on a plurality of interferograms obtained by the plurality of detection operations.

3. The Fourier transform spectrophotometer according to claim 1, further comprising a spectrum creator configured to obtain one interferogram from the intensity signals of the interference light obtained by the one detection operation, and for creating one spectrum by Fourier-transforming the one interferogram, wherein:
the information extractor is configured to compare a plurality of spectra obtained by a plurality of detection operations, to locate a peak which changes depending on the moving speed of the movable mirror, and to extract position information of the located peak as the speed-dependent information.

4. The Fourier transform spectrophotometer according to claim 3, further comprising a noise remover configured to remove, from each of the plurality of spectra obtained by the plurality of detection operations, a noise component which is a peak corresponding to the position information of the peak extracted by the information extractor.

5. The Fourier transform spectrophotometer according to claim 1, further comprising:
a corrector configured to correct the intensity signals of the interference light obtained by at least one detection operation among the plurality of detection operations, based on the speed-dependent information extracted by the information extractor; and
an interferogram creator configured to create an interferogram from the corrected intensity signals of the interference light.

6. The Fourier transform spectrophotometer according to claim 1, further comprising:
a corrector configured to correct the intensity signals of the interference light obtained by at least one detection operation among the plurality of detection operations, based on the speed-dependent information extracted by the information extractor; and a spectrum creator configured to obtain an interferogram from the corrected intensity signals of the interference light and to create a spectrum from the interferogram.

* * * * *